US010676133B2

United States Patent
Komiya et al.

(10) Patent No.: US 10,676,133 B2
(45) Date of Patent: Jun. 9, 2020

(54) FRONT SUB-FRAME STRUCTURE

(71) Applicant: MAZDA MOTOR CORPORATION, Hiroshima (JP)

(72) Inventors: Katsuyuki Komiya, Hiroshima (JP); Masaaki Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 165 days.

(21) Appl. No.: 15/762,684

(22) PCT Filed: Nov. 1, 2016

(86) PCT No.: PCT/JP2016/082476
§ 371 (c)(1),
(2) Date: Mar. 23, 2018

(87) PCT Pub. No.: WO2017/082124
PCT Pub. Date: May 18, 2017

(65) Prior Publication Data
US 2018/0273094 A1    Sep. 27, 2018

(30) Foreign Application Priority Data

Nov. 11, 2015 (JP) .................................. 2015-221130

(51) Int. Cl.
*B62D 21/11*    (2006.01)
*B62D 21/15*    (2006.01)
*B62D 7/16*    (2006.01)

(52) U.S. Cl.
CPC .............. *B62D 21/11* (2013.01); *B62D 7/163* (2013.01); *B62D 21/155* (2013.01)

(58) Field of Classification Search
CPC ...... B62D 21/11; B62D 21/155; B62D 7/163; B62D 3/12; B60G 21/055; B60G 21/0551;
(Continued)

(56) References Cited

U.S. PATENT DOCUMENTS 4,184,697 A * 1/1980 Suzuki ............... B60G 7/02
180/291
5,601,304 A * 2/1997 Tilly ................. B60G 3/06
280/124.15
(Continued)

FOREIGN PATENT DOCUMENTS

CN    203752819 U    8/2014
CN    104203724 A    12/2014
(Continued)

OTHER PUBLICATIONS

International Search Report issued in PCT/JP2016/082476; dated Dec. 6, 2016.

*Primary Examiner* — Laura Freedman
(74) *Attorney, Agent, or Firm* — Studebaker & Brackett PC

(57) ABSTRACT

A tension rod supporting part (14) is provided at a sub-frame front structure (10) of a front part of a front sub-frame (5); the side member (6) is disposed upward in one side and extended rearward from the tension rod supporting part (14); a rack arrangement step (A) opened downward for arranging a steering rack (55) is formed behind the tension rod supporting portion (14) and under the side member (6); and a stabilizer support part (62) is provided in the rack arrangement step (A).

2 Claims, 12 Drawing Sheets

(58) Field of Classification Search
CPC ........ B60G 2206/60; B60G 2204/1222; B60G 2204/15
See application file for complete search history.

(56) References Cited

U.S. PATENT DOCUMENTS

| | | | |
|---|---|---|---|
| 5,879,026 A * | 3/1999 | Dostert | B60G 3/24 |
| | | | 180/311 |
| 7,878,517 B2 * | 2/2011 | von Mayenburg | B60G 9/003 |
| | | | 280/124.116 |
| 9,937,762 B2 * | 4/2018 | Sunahiro | B60G 3/20 |
| 10,118,643 B2 * | 11/2018 | Komiya | B62D 21/06 |
| 2009/0160155 A1 | 6/2009 | Shimatami et al. | |
| 2013/0241166 A1 | 9/2013 | Paintmayer et al. | |
| 2015/0021115 A1 | 1/2015 | Komiya | |
| 2018/0265135 A1 * | 9/2018 | Komiya | B62D 21/06 |

FOREIGN PATENT DOCUMENTS

| | | |
|---|---|---|
| DE | 10 2006 013 548 A1 | 10/2007 |
| DE | 10 2009 004 310 A1 | 7/2010 |
| JP | H3-025082 A | 2/1991 |
| JP | 2007-069864 A | 3/2007 |
| JP | 2009-202857 A | 9/2009 |

* cited by examiner

FRONT SUB-FRAME STRUCTURE

TECHNICAL FIELD

The technique disclosed in this application relates to a front sub-frame structure disposed below a front side frame.

BACKGROUND ART

A typically-known front sub-frame includes a front part having a sub-crash can attachment part, a tension rod supporting part, and a cross member extending in the vehicle width direction so as to face the tension rod supporting part from the inside in the vehicle width direction.

Examples of such a front sub-frame include a configuration in which a crush can (1e) is supported by a tension rod supporting part (2) as illustrated in Patent Document 1, and a front sub-frame structure including a steering rack (7) disposed below the tension rod supporting part (1a) in addition to a tension rod supporting part (1a) and a cross member (2) as shown in Patent Document 2.

Such a front sub-frame needs to include a sub-crash can in as low a position as possible to lower the position of a load (such as a front collision load) receiving point.

In addition, the steering rack, which is disposed at substantially the same height as the front sub-frame, needs to be disposed below the side member extending to the rear side of the tension rod supporting part to improve the flexibility of assembly from the lower side of a steering rack and to improve the layout with other auxiliary machines such as engines. To satisfy such needs, a known front sub-frame includes a structure in which a front sub-frame is disposed so as to be displaced upward in one side (offset upward) with respect to the position of the sub-crush can. However, in such a structure, the load transmission path from the front to the rear of the front sub-frame is displaced in the vertical direction at the time of, e.g., a front collision.

Thus, even the front sub-frame in which the load transmission path is displaced in the vertical direction as described above needs to have a secured load transmission efficiency to the rear at the time of, e.g., a front collision and have an improved support stiffness of the tension rod and attachment stiffness of the sub-crash can.

CITATION LIST

Patent Documents

Patent Document 1: United States Patent Application Publication No. 2013/0241166
Patent Document 2: German Patent Invention No. 102009004310

SUMMARY

Technical Problem

For a suspension of a tension rod type, a tension rod supporting part is provided at a front part of a front sub-frame. Thus, as described above, it is difficult to secure the support stiffness of a tension rod and to achieve a compact layout in which a tension rod supporting part, a side member from which the tension rod supporting part extends rearward, a stabilizer, and a steering rack are provided at the front part of the front sub-frame.

Patent Documents 1 and 2 do not disclose the technical ideas for achieving a compact layout in which the tension rod supporting part, the side member, the stabilizer, and the steering rack are provided at the front part of the front sub-frame, and also improving the support stiffness of the tension rod. Thus, there was a room for further study.

The technique disclosed in this specification aims to provide a compact configuration of the front part of the front sub-frame and increase the support stiffness of the tension rod.

Solution to the Problem

The front sub-frame structure of the technique disclosed in this specification is directed to an automobile front sub-frame structure including a pair of left and right front side frames extending from a cabin front face toward a vehicle front, and a front sub-frame disposed below the front side frame and supporting a front suspension device, wherein a tension rod supporting part is provided at a front part of the front sub-frame; the side member is disposed upward in one side and extended rearward from the tension rod supporting part; a rack arrangement step opened downward for arranging a steering rack is formed behind the tension rod supporting portion and under the side member; and a stabilizer support part is provided in the rack arrangement step.

According to the above configuration, in the suspension of a tension rod type, the stabilizer support part is provided in the rack arrangement step. Thus, the support stiffness of a tension rod can be increased, and the tension rod supporting part, the stabilizer support part, and the steering rack can be arranged so as to overlap in the vertical direction along the vehicle longitudinal direction. Thus, the compact configuration can be achieved in the vertical direction.

Preferably, a sub-crash can attachment part is provided in front of the tension rod supporting part; between a rear face of the tension rod supporting part and a front face of the side member, a closed-section coupling part having a closed-section extending in a longitudinal direction and coupling the rear face of the tension rod supporting part and the front face of the side member is provided; and the stabilizer support part is fastened so as to connect an upper and lower faces of the closed-section coupling part.

According to the above configuration, both the assembling property of the stabilizer to the closed-section coupling part and the reinforcement of the rack arrangement step in the longitudinal direction by the stabilizer support part can be achieved. Thus, the attaching stiffness of the sub-crush can can be increased.

Preferably, the stabilizer support part is disposed to be sandwiched between the rear face of the tension rod supporting part and the steering rack.

According to the above configuration, when the recess is bent and deformed by the front collision load, the load can be dispersed backward by the stabilizer support part and the steering rack disposed in the recess.

Advantages of the Invention

The technique disclosed in this specification can provide a compact configuration of the front part of the front sub-frame and increase the support stiffness of the tension rod.

DESCRIPTION OF EMBODIMENTS

An embodiment will be described hereinafter with reference to the drawings.

FIGS. 1 through 7 illustrate a front sub-frame structure of an automobile of this embodiment.

Figure 1:
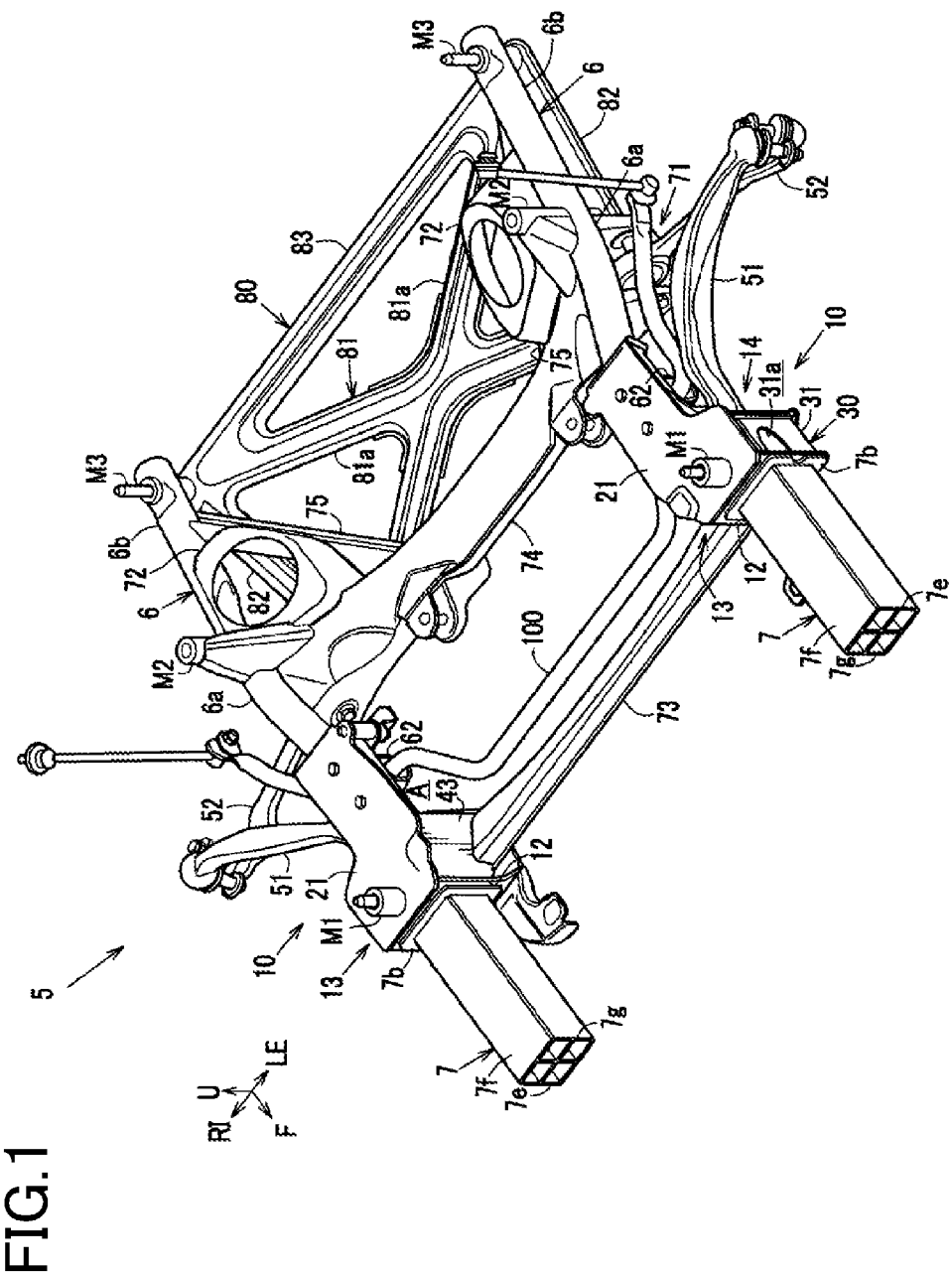
FIG. 1 is a perspective view of a front sub-frame of a vehicle according to an embodiment.
Figure 7:
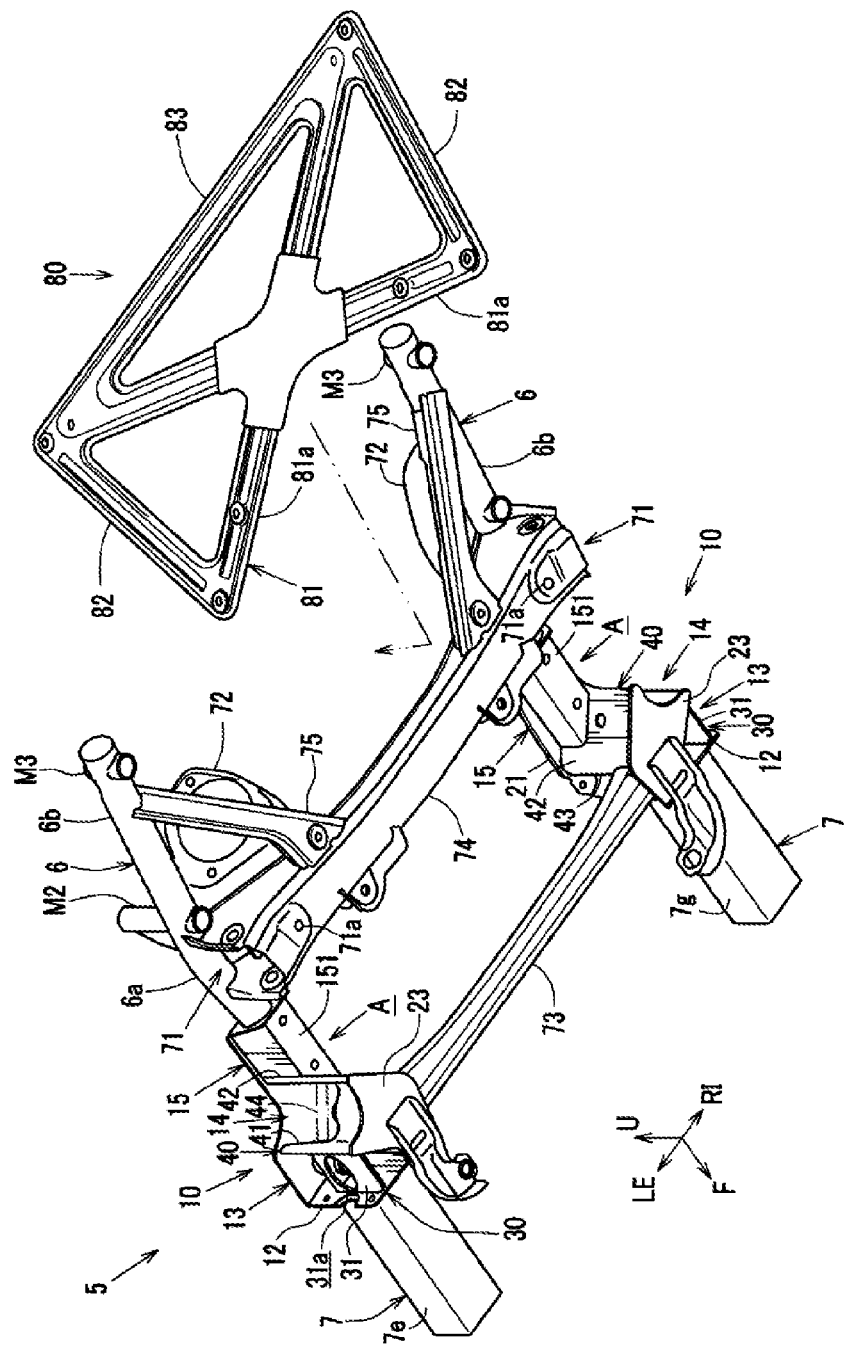
FIG. 7 is an illustration of a configuration of a brace of the front sub-frame.

In particular, FIG. 1 is a perspective view of a front sub-frame of the vehicle according to this embodiment when viewed downward from an obliquely left front portion. FIG. 7 is a disassembled perspective view of a brace and the front sub-frame from which the brace is detached, when viewed from below.

Figure 2:
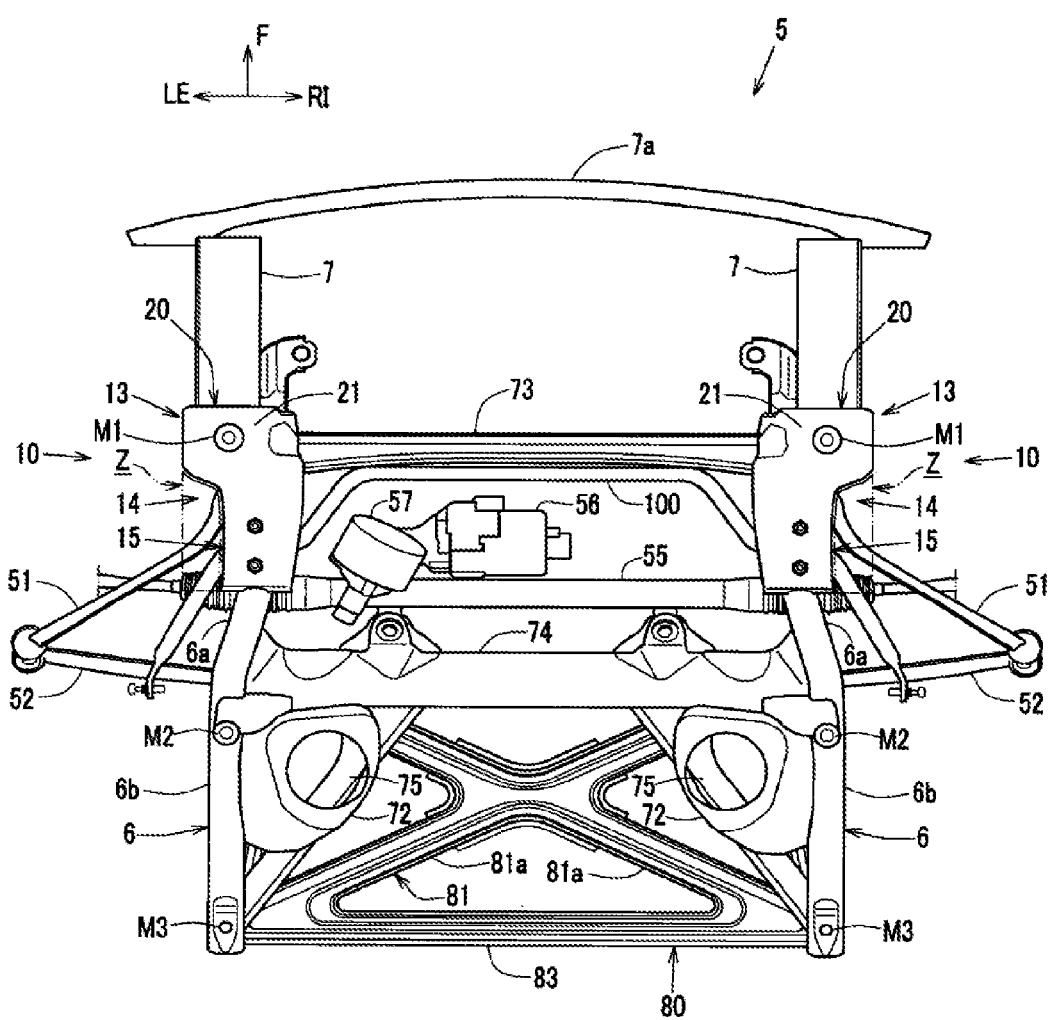
FIG. 2 is a plan view of the front sub-frame.
Figure 4:
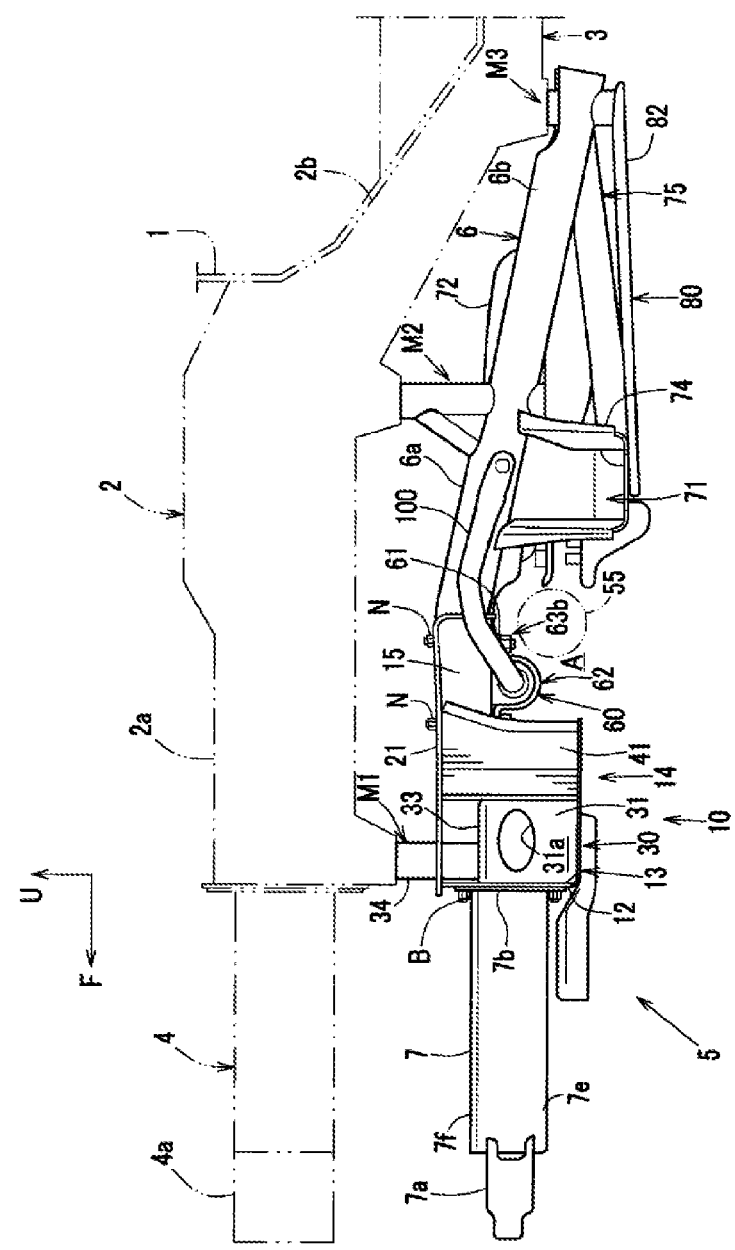
FIG. 4 is a left side view of the front sub-frame.
Figure 5:
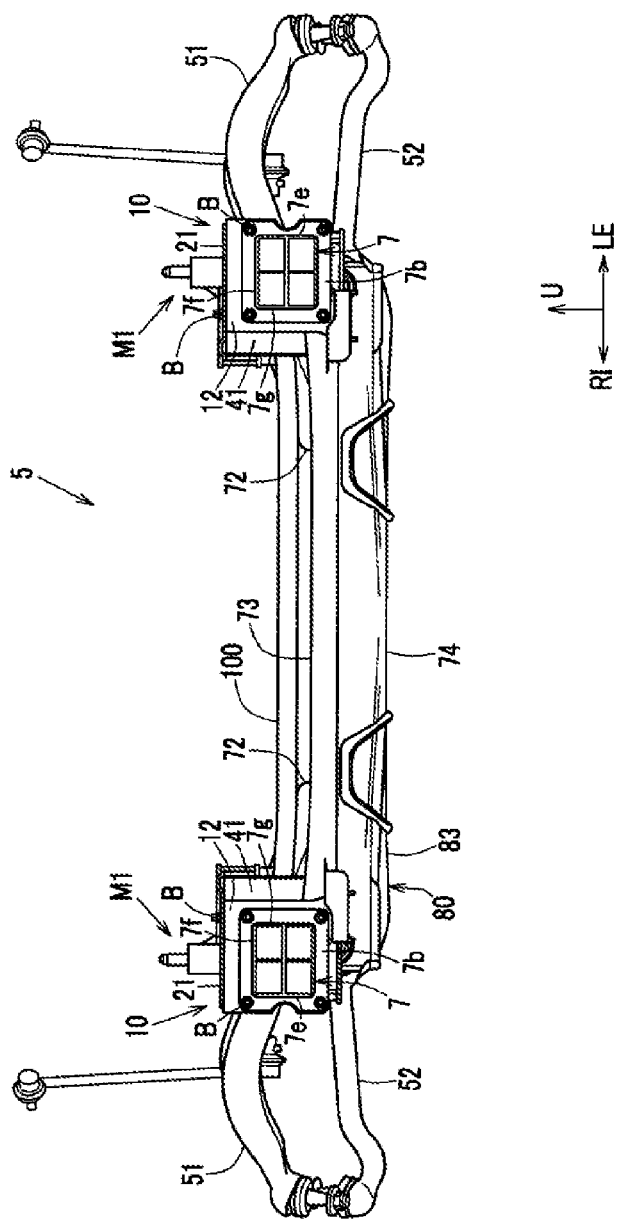
FIG. 5 is a front view of the front sub-frame.
Figure 6:
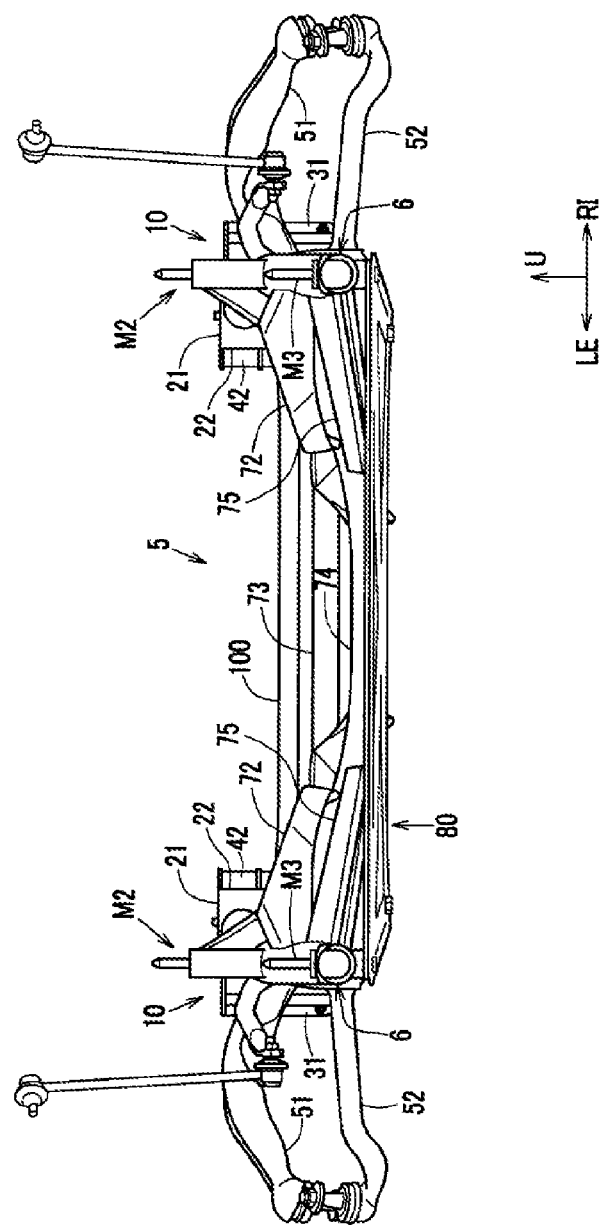
FIG. 6 is a rear view of the front sub-frame.
Figure 8:
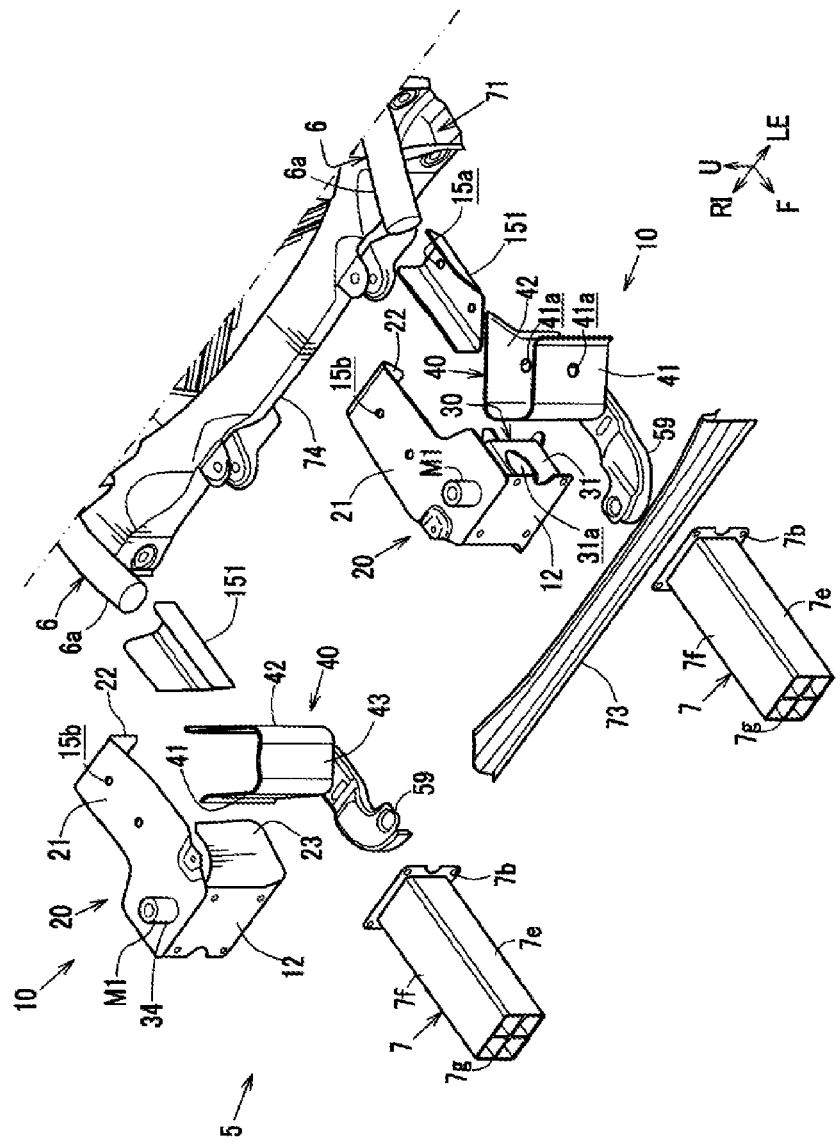
FIG. 8 is a disassembled perspective view of a front portion of the front sub-frame.

In the drawings concerning this embodiment except FIG. 2, a steering rack 55, a power steering actuator (a power steering motor) 56, and a power steering pinion 57 are not shown. FIG. 4 does not show tension rods 51 and lower arms 52. FIGS. 5 and 6 do not show a sub-bumper reinforcement 7a. FIGS. 7 and 8 described later do not show a stabilizer support part 62 and a stabilizer 100, in addition to the sub-bumper reinforcement 7a, the tension rods 51, and the lower arms 52. In addition, in the drawings concerning the following embodiment, arrow F represents the vehicle front, arrow LE represents the left in the vehicle width direction, arrow RI represents the right in the vehicle width direction, and arrow U represents upward of the vehicle.

As illustrated in FIG. 4, a front portion of the automobile includes a dash panel 1 disposed at a front face of a cabin and a pair of left and right front side frames 2 and 2 (only left one of which is shown) extending forward from a lower portion of the dash panel 1. Below the front side frame 2, as illustrated in FIGS. 1 through 6, a front sub-frame 5 supporting the lower arms 52 (lateral rods) (see FIGS. 1 and 2) substantially horizontally extending outward in the vehicle width direction and the tension rods 51 (see the same drawings) extending from ahead of the lower arms 52 to the rear and extending outward in the vehicle width direction are disposed.

Each of the front side frames 2 according to this embodiment includes a horizontal portion 2a extending substantially horizontally along the vehicle longitudinal direction (longitudinal direction) in side view and a kick-up portion 2b (tilt portion) extending and declining rearward from the rear end of the horizontal portion 2a along the lower end of the dash panel 1. A floor frame 3 extending rearward in the vehicle is connected to the rear end of the kick-up portion 2b (see FIG. 4). The front end of the front side frame 2 is provided with a metal crash can 4 constituted by, for example, a cylindrical body projecting forward in the vehicle. A bumper reinforcement 4a extending in the vehicle width direction is attached to the front end face of the crash can 4.

As illustrated in FIGS. 1 through 7, the front sub-frame 5 mainly includes: a pair of left and right side members 6 and 6 extending in the vehicle longitudinal direction (longitudinal direction); sub-crash cans 7 extending forward of the side members 6; a sub-frame front structure 10 (coupling member) coupling the side members 6 and the sub-crash cans 7 to each other in the longitudinal direction and constituting a front portion of the front sub-frame 5; a sus-cross member 73 (hereinafter referred to as a "sus-cross member 73") extending in the vehicle width direction to couple the pair of left and right sub-frame front structures 10 and 10; a rear cross member 74 extending in the vehicle width direction to couple the pair of left and right side members 6 and 6 to each other; a tilt member 75 coupled to the members 6 and 6, and 74 behind the rear cross member 74 between the pair of side members 6 and 6; and a brace 80.

As illustrated in FIGS. 1, 2, and 4, mount parts M1, M2, and M3 (e.g., mount bushes and a mount pipe 34) each projecting upward are coupled to the front sub-frame 5 at three points at each of the left and right sides, that is, a front portion of the sub-frame front structure 10, a longitudinally intermediate portion of the side member 6, and the rear end of the side member 6. Specifically, the first mount part M1 (front vehicle body attachment part), the second mount part M2, and the third mount part M3 (rear vehicle body attachment part) are arranged in this order from the front to the rear.

As illustrated in FIG. 4, the first mount part M1 is coupled to the front end of the horizontal portion 2a of the front side frame 2 of the vehicle body, the second mount part M2 is coupled to a rear portion of the horizontal portion 2a, and the third mount part M3 is coupled to the front end of the floor frame 3 (as portion connected to the kick-up portion 2b).

In the manner described above, the front sub-frame 5 is mounted on the vehicle body at three points on one side in the longitudinal direction, that is, at six points in total on both lateral sides, and is disposed under the vehicle body.

Figure 3:
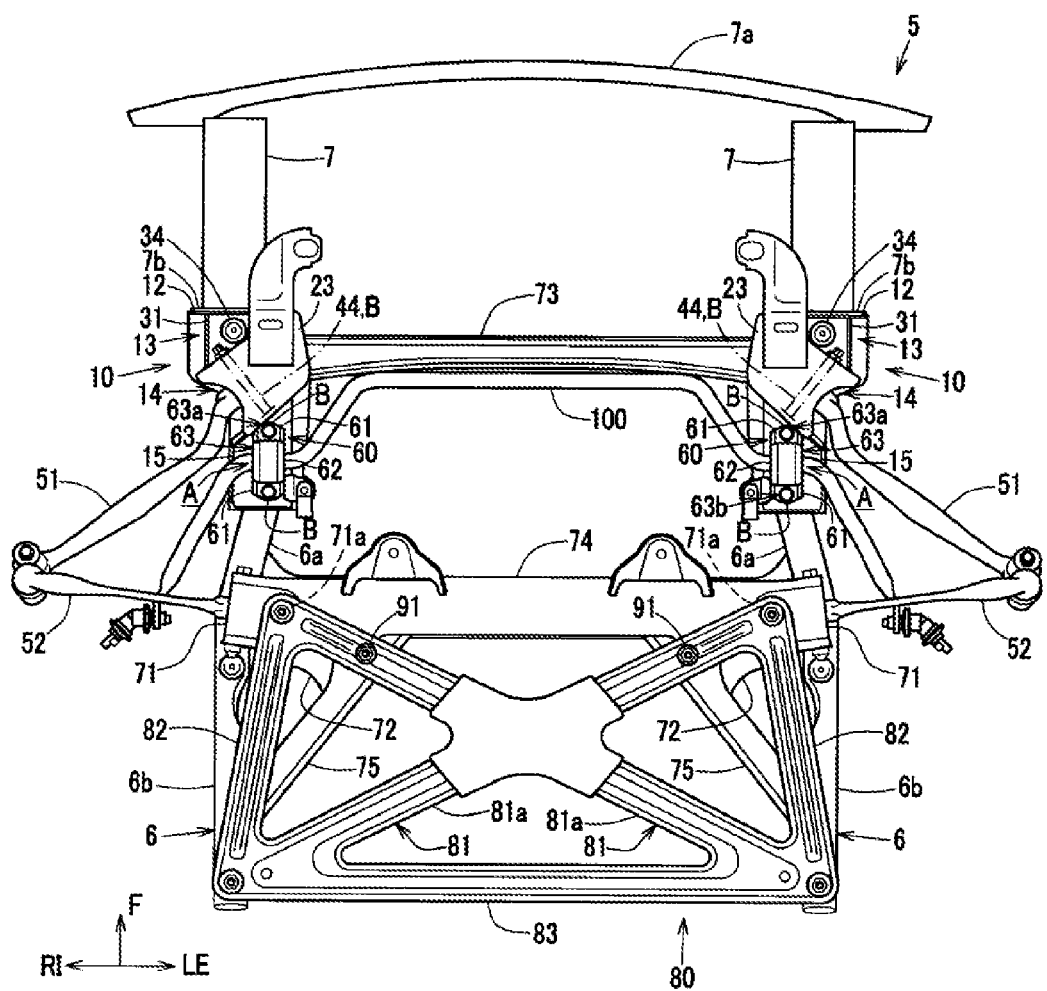
FIG. 3 is a bottom view of the front sub-frame.

The sub-crash cans 7 are impact energy absorbing members similar to the crash cans 4 at the front ends of the front side frames 2. As illustrated in FIGS. 2 through 4, a sub-bumper reinforcement 7a extending in the vehicle width direction are attached to the front ends of the sub-crash cans 7 and couples the front ends of the left and right sub-crash cans 7 to each other.

As illustrated in FIG. 4, the side members 6 are bridged below the pair of left and right front side frames 2 and the floor frame 3, and as illustrated in FIGS. 1 through 4 and 7, extend longitudinally in a rounded pipe shape. Each of the side members 6 includes a side member front portion 6a disposed ahead of the second mount part M2 in the longitudinal direction of the side member 6 and a side member rear portion 6b disposed behind the second mount part M2 in the longitudinal direction of the side member 6 (not shown).

Both the side member front portions 6a and the side member rear portions 6b decline rearward in side view (see FIG. 4). More specifically, the side member front portions 6a tilt outward in the vehicle width direction in plan view from the front end toward the second mount part M2 (see FIGS.

2 and 3), and the left and right side member rear portions 6b extend in parallel in the longitudinal direction in plan view (see the same drawings).

As illustrated in FIGS. 1 through 5 and 7, the sub-frame front structure 10 includes sub-crash can attachment parts 12, front vehicle body attachment parts 13, tension rod supporting parts 14, and closed-section coupling parts 15 interposed between the sub-crash cans 7 and the side members 6, arranged in this order from the front to the rear, and serving as set plates for attaching rear brackets (rear flanges) 7b of the sub-crash cans 7.

In other words, as illustrated in FIGS. 8 through 12, the sub-frame front structure 10 is constituted by assembling a plurality of panel members in a three-dimensional shape, and includes sub-frame front structure bodies 20, tension rod supporting brackets 40, and closed-section forming panels 151.

Figure 9A:
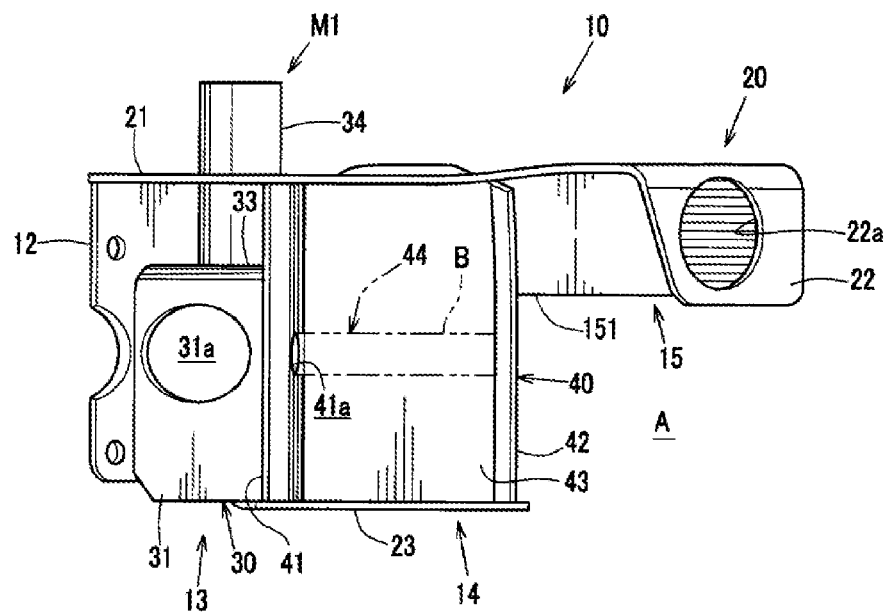
FIG. 9A is an illustration of a configuration of a front structure of the sub-frame.
Figure 9B:
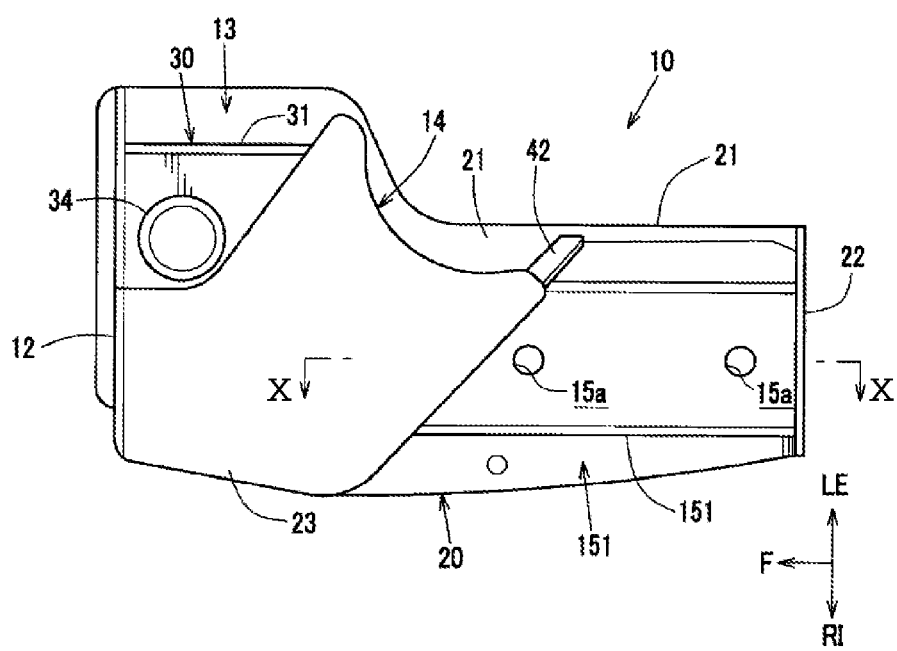
FIG. 9B is an illustration of the configuration of the front structure of the sub-frame.
Figure 10:
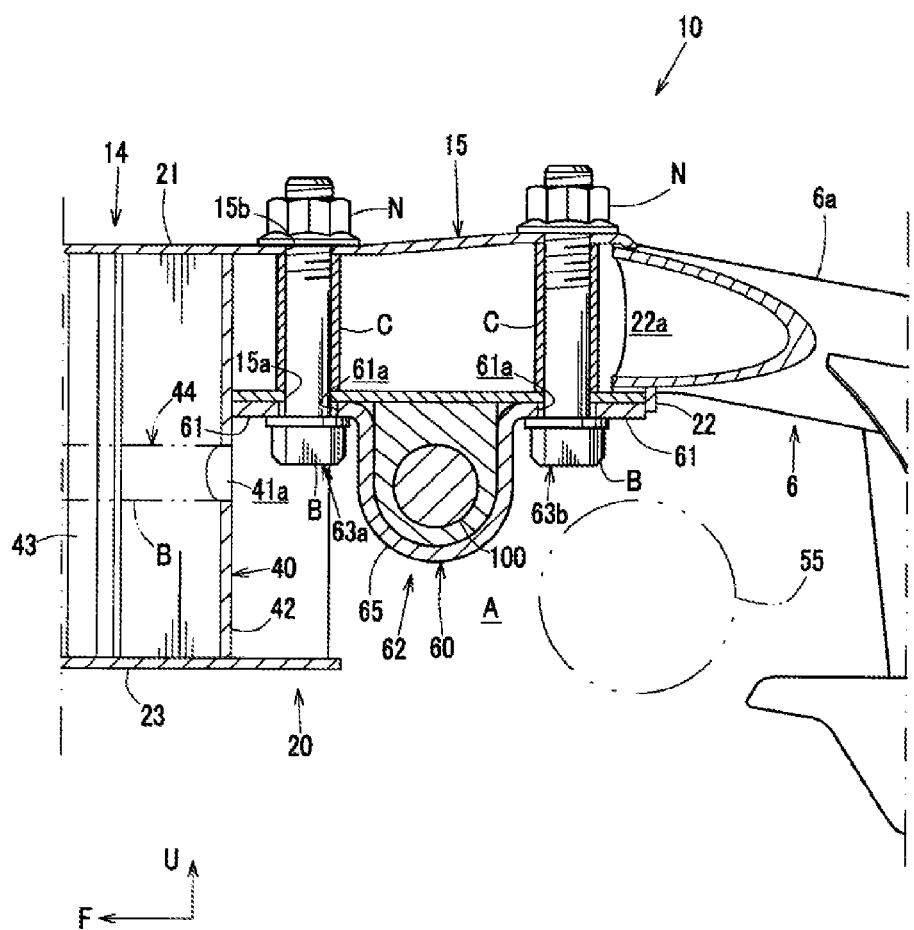
FIG. 10 is an illustration of a structure for fastening a stabilizer to the closed-section coupling part.
Figure 11A:
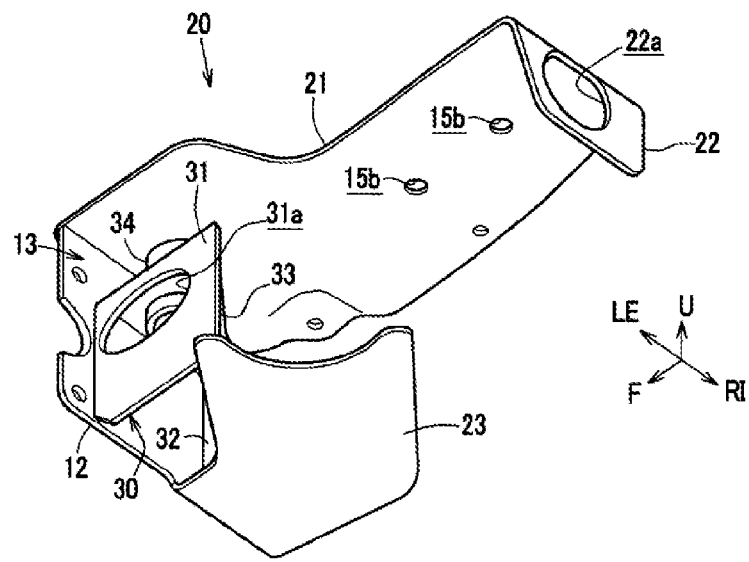
FIG. 11A is an illustration of the configuration of a body of the front structure of the sub-frame.
Figure 11B:
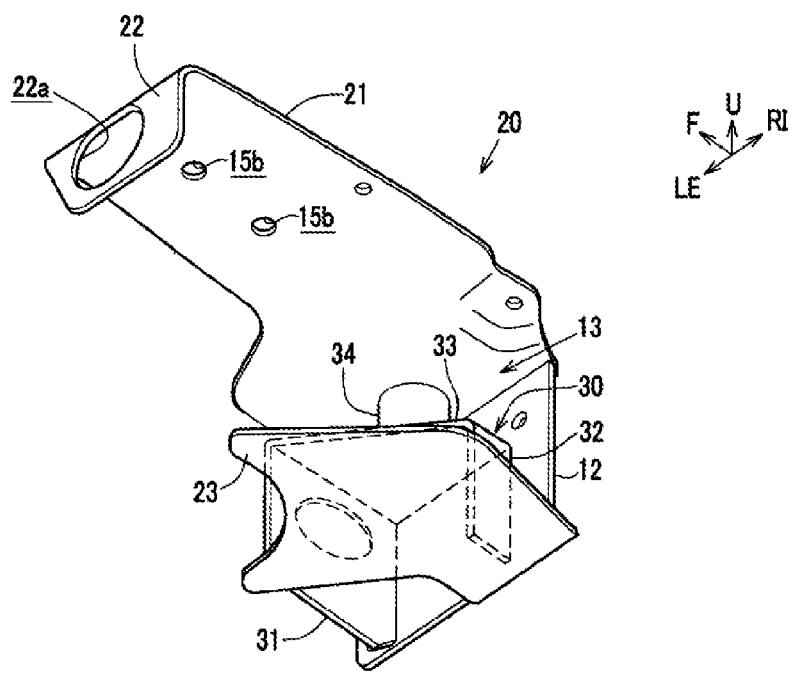
FIG. 11B is an illustration of the configuration of the body of the front structure of the sub-frame.
Figure 12A:
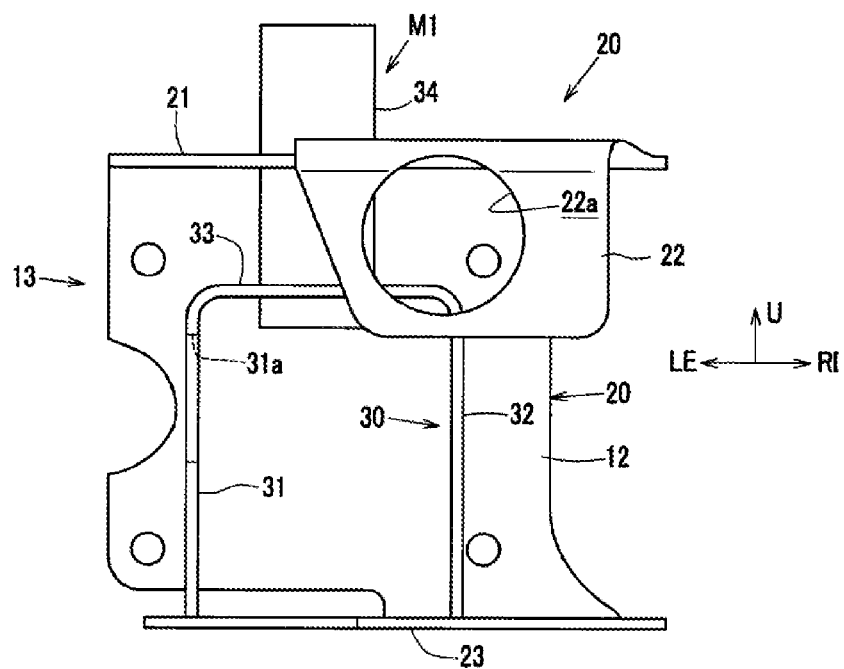
FIG. 12A is an illustration of the configuration of a body of the front structure of the sub-frame.
Figure 12B:
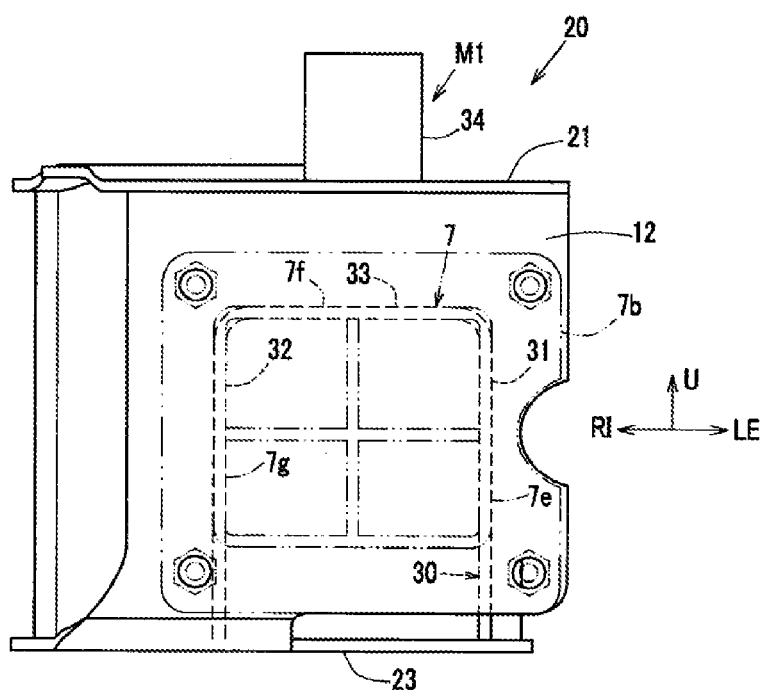
FIG. 12B is an illustration of the configuration of the body of the front structure of the sub-frame.

FIG. 8 is a disassembled perspective view of a front portion of the front sub-frame, especially the sub-frame front structure. Reference numeral 59 in FIG. 8 denotes a radiator supporting bracket. FIG. 9A is a perspective view of the left sub-frame front structure when viewed from an obliquely left rear portion at an angle of 45 degrees. FIG. 9B is a bottom view of the sub-frame front structure. FIG. 10 is an enlarged sectional view of a portion corresponding to line X-X in the front sub-frame in FIG. 9B. FIG. 11A is a perspective view of a body of the left sub-frame front structure when viewed from an obliquely left bottom portion. FIG. 11B is a perspective view of a body of the sub-frame front structure when viewed from an obliquely right rear bottom portion. FIG. 12A is a back view of the body of the sub-frame front structure. FIG. 12B is a front view of the body of the sub-frame front structure.

Each of the sub-frame front structure bodies 20 includes an upper face portion 21 having a length corresponding to the length of the sub-frame front structure 10 in the longitudinal direction, a rear face portion 22 bending downward from the rear end of the upper face portion 21 and having a protruding shape, a sub-crash can attachment part 12 which corresponds to the front face of the sub-frame front structure 10 and to which the rear bracket 7b of the sub-crash can 7 is attached, and a bottom face portion 23 (see the same drawings).

As illustrated in FIGS. 1, 2, 7, 8, 9B, 11A, and 11B, the upper face portion 21 has an outer portion, in the vehicle width direction, of a portion corresponding to the tension rod supporting part 14 in the longitudinal direction gradually decreasing inward in the vehicle width direction toward, and the outer portion in the vehicle width direction is notched inward in the vehicle width direction so that a portion corresponding to the closed-section coupling part 15 extends rearward with the substantially same width.

As illustrated in FIGS. 9A, 10, 11A, 11B, and 12A, the rear face portion 22 corresponds to the rear face of the closed-section coupling part 15, has a circular opening 22a in which a front portion of the side member 6 is inserted, and is formed as a side member joint face that is joined and fixed with the front end of the side member 6 inserted in the opening 22a.

As illustrated in FIGS. 4, 5, 8, 11A, 11B, 12A, and 12B, the sub-crash can attachment part 12 corresponds to the front face of the sub-frame front structure 10, and is formed as a set plate having a substantially rectangular shape in front view larger than the rear bracket 7b at the rear end of the sub-crash can 7.

The rear bracket 7b at the rear end of the sub-crash can 7 faces the sub-crash can attachment part 12, and as illustrated in FIGS. 4 and 5, the sub-crash can 7 is fastened and fixed with a bolt B and a nut (not shown), for example, and is coupled to the sub-frame front structure 10.

As illustrated in FIGS. 7, 8, 9B, 11A, and 11B, the bottom face portion 23 protrudes rearward on the lower face of the sub-frame front structure 10 to form a later-described bottom surface of the tension rod supporting part 14 from the lower end portion of the sub-crash can attachment part 12, and then extends obliquely rearward and inward in the vehicle width direction.

In addition, as illustrated in FIGS. 4, 7, 8, 9A, 11A, 11B, and 12A, the sub-frame front structure body 20 includes a sub-crash can load transferring member 30 below the upper face portion 21 in a portion corresponding to the front vehicle body attachment part 13 described later. The sub-crash can load transferring member 30 has an outer face 31, an inner face 32, and a partition wall 33 that form an arch shape (a substantially U shape, and a Japanese character "コ") that is open downward in cross section taken orthogonally to the longitudinal direction (see FIG. 12A). The sub-crash can load transferring member 30 is bridged between the rear face of the sub-crash can attachment part 12 and a front wall face 41 of the tension rod supporting part 14 (see FIGS. 4, 7, and 9A).

The outer face 31 of the sub-crash can load transferring member 30 is disposed on the outer side in the vehicle width direction of the front vehicle body attachment part 13 of the sub-frame front structure 10, and has a width corresponding to the length between the sub-crash can attachment part 12 and the front wall face 41 of the tension rod supporting part 14 in the longitudinal direction in the outer side on the outer side in the vehicle width direction of the front vehicle body attachment part 13. The inner face 32 of the sub-crash can load transferring member 30 is disposed on the inner side in the vehicle width direction of the front vehicle body attachment part 13 so as to face the outer face 31 in the vehicle width direction, and has a width corresponding to the length between the sub-crash can attachment part 12 and the front wall face 41 of the tension rod supporting part 14 in the longitudinal direction on the inner side in the vehicle width direction of the front vehicle body attachment part 13.

That is, as illustrated in FIGS. 11A and 11B, the inner face 32 of the sub-crash can load transferring member 30 is formed to be smaller in width than the outer face 31. As illustrated in FIGS. 1, 4, 7, 8, 9A, and 11A, an elliptical service hole 31a (a working through hole) having a major axis in the longitudinal direction is formed.

As illustrated in FIG. 12A, the partition wall 33 corresponds to the upper face of the sub-crash can load transferring member 30, is formed to couple, in the vehicle width direction, the upper ends of the outer face 31 and the inner face 32 supporting each other in the vehicle width direction, faces the upper face portion 21 of the sub-frame front structure 10 from below the upper face portion 21, and partitions internal space of the front vehicle body attachment part 13 into upper and lower parts. That is, the front vehicle body attachment part 13 does not have a bottom face and is open at the bottom, and the upper face portion 21 and the partition wall 33 constitute a so-called two-storied structure.

The partition wall 33 has a trapezoidal shape in plan view, where the length in the longitudinal direction is short toward the inside of the vehicle width direction so that the rear end side of the partition wall 33 abuts against the front wall face 41 of the tension rod supporting part 14 arranged toward the outside in the vehicle width direction (see FIG. 11B).

Here, as illustrated in FIG. 12B, the partition wall 33, the outer face 31, and the inner face 32 of the sub-crash can load transferring member 30 are disposed along the outer shell of the sub-crash can 7.

Specifically, the partition wall 33, the outer face 31, and the inner face 32 of the sub-crash can load transferring member 30 are flush with an upper face 7f, an outer face 7e, and an inner surface 7g of the sub-crash can 7 through a rear bracket 7b of the of the sub-crash can 7 and the sub-crash can attachment part 12 along the longitudinal direction (see the same figure).

As illustrated in FIGS. 1 through 5, 9A, 11A, 11B, 12A, and 12B, the front vehicle body attachment part 13 (a so-called "protruding member") in the sub-frame front structure 10 is provided with the mount pipe 34 communicating in the vertical direction (top-bottom direction) in center portions of the upper face portion 21 and the partition wall 33 in plan view and standing and extending in a tower shape upward from the upper face portion 21, and constitutes the first mount part M1.

In addition, as illustrated in FIG. 8, each of the tension rod supporting brackets 40 has a front wall face 41 and a rear wall face 42 each extends rearward at the outer side in the vehicle width direction and a laterally inner wall face 43 coupling the laterally inner front ends of the front and rear wall faces 41 and 42 toward laterally inner rear portions. The front wall face 41, the rear wall face 42, and the laterally inner wall face 43 form a substantially U shape in plan view that is open rearward and outward in the vehicle width direction. The tension rod supporting bracket 40 is interposed between the upper face portion 21 and the bottom face portion 23 of the sub-frame front structure body 20 (see also FIGS. 1, 4, 7, 9A, and 9B).

As illustrated in FIGS. 8, 9A, and 10, the front wall face 41 and the rear wall face 42 of the tension rod supporting bracket 40 include opposed tension rod supporting holes 41a. A bolt B bridged between the pair of tension rod supporting holes 41a and 41a and a nut (not shown) for fastening the bolt B constitute a tension rod supporting shaft 44 for pivotally supporting a proximal end of the tension rod 51. The tension rod supporting bracket 40 including the tension rod supporting shaft 44 is formed as the tension rod supporting part 14 (see FIG. 9A).

In addition, as illustrated in FIGS. 1 through 3 and 7, the lateral ends of the sus-cross member 73 described above are coupled to the lateral inner surfaces of the laterally inner wall faces 43 in the tension rod supporting parts 14.

As illustrated in FIG. 8, the closed-section forming panel 151 has a hat shape that is open upward in a cross section orthogonal to the longitudinal direction. As illustrated in FIGS. 7, 9A, and 9B, the closed-section forming panel 151 is joined to the lower face of a rear portion of the upper face portion 21 of the sub-frame front structure body 20 to thereby constitute the closed-section coupling part 15 having a closed cross section extending in the longitudinal direction.

In addition, as illustrated in FIGS. 3, 4, 7, 9A, and 10, the closed-section coupling part 15 is displaced upward in one side and extends rearward with respect to the rear wall face 42 of the tension rod supporting part 14. A recess A that is opened downward for arranging the steering rack 55, for example, is formed behind the tension rod supporting part 14 and below the closed-section coupling part 15.

As illustrated in FIGS. 1 through 6, the stabilizer 100 is disposed and extends in the vehicle width direction along the laterally inner wall face 43 of the tension rod supporting part 14 and the sus-cross member 73.

Specifically, the stabilizer 100 extends substantially horizontally in the vehicle width direction near a portion behind the sus-cross member 73, and the lateral ends of the stabilizer 100 extend with a tilt rearward and outward in the vehicle width direction across and below the closed-section coupling part 15 in plan view. A portion of the stabilizer 100 below and across the closed-section coupling part 15 extends horizontally in the vehicle width direction to pass over the recess A below the closed-section coupling part 15 (see FIGS. 3 and 4).

As well known, the stabilizer 100 is used to reduce a roll angle in a bump or a rebound of only one wheel caused by resistance of torsional stiffness.

As illustrated in FIGS. 1, 3, 4, and 10, the stabilizer 100 described above is fastened and fixed to the lower face of the closed-section coupling part 15 with a stabilizer attaching bracket 60 holding the stabilizer 100, a bolt B, a nut N, and a collar C. In this manner, the stabilizer attaching bracket 60 holding the stabilizer 100 constitutes the stabilizer support part 62, and the stabilizer support part 62 is disposed in the recess A.

Specifically, as illustrated in FIG. 10, the stabilizer attaching bracket 60 includes a bracket main body part 65 formed in a substantially U shape, a pair of flanges 61 and 61 protruding in directions away from each other from the opening end part thereof, and a through hole 61a is formed in each of the pair of flanges 61 and 61.

On the upper and lower faces of the closed-section coupling part 15, through holes 15a and 15b as stabilizer support holes are formed. The through hole 61a is formed in the pair of flanges 61 and 61. The through holes 15a and 15b communicate with the through hole 61a in the vertical direction in a state in which the pair of flanges 61 and 61 are arranged in the front and rear sides of the lower face of the closed-section coupling part 15 (see FIG. 10).

The stabilizer 100 is fastened by the lower face of the closed-section coupling part 15 as follows. That is, in a state in which the stabilizer 100 is held by the bracket main body part 65, the pair of flanges 61 and 61 are disposed on the front and rear sides of the lower face of the closed-section coupling part 15 so that the through hole 61a formed in the front and rear flanges 61, and the through holes 15a and 15b formed in the upper and lower faces of the closed-section coupling part 15 communicate with each other.

Further, the bolt B is inserted between the through hole 61a of the flange 61, the through hole 15a on the lower face of the closed-section coupling part 15, the collar C erected in the internal space of the closed-section coupling part 15, the through hole 15b on the upper face of the closed-section coupling part 15 in this order from the lower side to the upper side, and a protruding part protruding from the through hole 15b formed on the upper face of the closed-section coupling part 15 is fastened with the nut N.

Thus, the stabilizer support part 62 is disposed in the recess A (see FIGS. 3, 4 and 10), and, as illustrated in FIGS. 3 and 10, on the lower face of the closed-section coupling part 15, stabilizer fastening parts 63a, 63b (a front stabilizer fastening part 63a and a rear stabilizer fastening part 63b) are arranged in parallel in the longitudinal direction through the stabilizer support part 62.

Accordingly, as illustrated in FIGS. 3 and 7, the tension rod support shaft 44 (the pair of tension rod supporting holes 41a, 41a), the stabilizer fastening parts 63a, 63b (the through holes 15a, 15b as the stabilizer support holes), and the side member 6 are arranged in the longitudinal direction in series.

As illustrated in FIGS. 1, 3, 4, 7, and 8, joint portions of the rear cross member 74 to the side members 6 and 6 at both ends in the vehicle width direction are provided with arm supporting parts 71 supporting the proximal ends of the lower arms 52 in such a manner that the lower arms 52 extending outward in the vehicle width direction can be pivotally supported in the vertical direction in order to determine the position of the front wheels in the vehicle width direction. That is, the left and right side members 6 and 6 support the lower arms 52 through the rear cross member 74.

In addition, as illustrated in FIGS. 1, 4, 6, and 7, a pair of left and right tilt members 75 is disposed behind the front sub-frame 5. The distance between the tilt members 75 and 75 in the vehicle width direction gradually increases toward the rear in plan view (i.e., the tilt members 75 and 75 form a Japanese character "ハ"). Specifically, the front ends of the tilt members 75 are joined to left and right intermediate portions laterally separated from a laterally intermediate portion of the rear cross member 74, and linearly tilt rearward and outward in the vehicle width direction so that the distance between the tilt members 75 increases toward the rear to couple the left and right intermediate portions to the third mount parts M3 as rear-end vehicle attachment parts of the left and right side members 6 (see FIGS. 2, 3, and 7).

As illustrated in FIGS. 1 through 6, the brace 80 includes a plurality of brace members 81, 82, and 83 described later disposed to constitute a plane substantially orthogonal to the vertical direction. The brace 80 is disposed below the pair of left and right side member rear portions 6b and 6b and the rear cross member 74 extending in the vehicle width direction ahead of the members 6b and 6b, and covers space that formed by the members 6b, 6b, and 74 and having a substantially U shape open to the rear in plan view.

Specifically, as illustrated in FIGS. 1 through 3 and 7, the brace 80 integrally includes the X-shaped member body 81 (X-shaped beam), the pair of left and right longitudinally extending members 82 and 82 (longitudinal beams), and the rear-end laterally extending member 83 (lateral beam).

The X-shaped member body 81 includes: one diagonally extending member 81a linearly coupling the left arm supporting part 71 to the third mount part M3 (rear vehicle body attachment part) of the right side member 6 diagonally disposed to the left arm supporting part 71 in plan view; and another diagonally extending member 81a linearly coupling the right arm supporting part 71 to the third mount part M3 (rear vehicle body attachment part) of the left side member 6 diagonally disposed to the right arm supporting part 71. These diagonally extending members 81a and 81a constituting a pair are crossed at the center to form an X shape in plan view (see FIGS. 3 and 7).

The longitudinally extending members 82 and 82 extend longitudinally at the left and right sides of the brace 80. That is, left and right longitudinally extending members 82 and 82 constituting a pair are disposed to linearly couple proximal ends 71a of the corresponding arm supporting parts 71 (laterally inner ends of the arm supporting parts 71) (see FIGS. 3 and 7) to the rear vehicle body attachment parts (third mount parts M3) of the side members 6.

Specifically, the longitudinally extending members 82 and 82 are coupled to lower parts of the proximal ends 71a on the left and right sides, and extends substantially horizontally forward from the rear vehicle body attachment part (the third mount part M3) of the side member 6 to be away from the side member 6. Thus, the support stiffness of the arm supporting part 71 with respect to the vehicle body is increased. In addition, the load transmitted from the tension rod supporting part 14 to the side member 6 during traveling can be dispersed from the arm supporting part 71 to the brace 80 so that the stiffness can be increased.

In the manner described above, the proximal ends 71a of the arm supporting parts 71 are displaced to the inside in the vehicle width direction relative to the joint portions of the rear cross member 74 to the side members 6 in the vehicle width direction. The proximal ends 71a of the arm supporting parts 71 are coupled to the rear ends of the left and right longitudinally extending members 82 and 82. The brace 80 is disposed in such a manner that the pair of left and right longitudinally extending members 82 and 82 gradually tilt inward in the vehicle width direction relative to the longitudinal direction in which the side members 6 extend (see FIG. 3).

As illustrated in FIGS. 1 through 3 and 7, the rear-end laterally extending member 83 extends in the vehicle width direction at the rear end of the brace 80. That is, the rear-end laterally extending member 83 extends to linearly couple the third mount parts M3 of the left and right side members 6 and 6 to each other.

The X-shaped member body 81, the pair of left and right longitudinally extending members 82 and 82, and the rear-end laterally extending member 83 are integrally joined together and form a brace face. Thus, the assembly of the members forming a triangular shape (truss shape) in plan view can be disposed on a place constituting the brace face (see the same drawings).

Although the brace 80 according to this embodiment does not include a front-end laterally extending member that extends in the vehicle width direction at the front end of the brace 80, but may include additional members as appropriate.

As described above, the brace 80 and the tilt members 75 are coupled to the rear cross member 74 and the pair of left and right side members 6 and 6, respectively, and also as illustrated in FIG. 3, intermediate coupling parts 91 are provided to couple the brace 80 and an intermediate part between the tilt members 75. In this embodiment, the intermediate connecting part 91 couples a front part of the diagonally extending member 81a of the brace 80 with a front part of the tilt member 75.

The front sub-frame 5 according to this embodiment is constituted by the left and right side member rear portions 6b and 6b and the rear cross member 74 to form a substantially U shape that is open at the rear in plan view. Above this substantially U-shaped inner space open to the rear in plan view, a longitudinal engine (not shown) in which crank shafts are arranged in the longitudinal direction is disposed. Thus, as illustrated in FIGS. 1 through 7, engine mount brackets 72 for mounting the longitudinal engine are disposed at corners between the left and right side member rear portions 6b and 6b and the rear cross member 74.

The engine mount brackets 72 are integrally joined by welding to each of the rear cross member 74, the tilt members 75, and the side members 6. That is, these members 6, 74, and 75 are coupled to each other through the engine mount brackets 72.

In the front sub-frame structure of this embodiment, the tension rod supporting part 14 is provided at the front part of the front sub-frame 5, the side member 6 is extended rearward from the tension rod supporting part 14, the recess A opened downward for arranging a rack (arranging the steering rack 55) is formed behind the tension rod supporting portion 14 and under the side member 6, and the stabilizer support part 62 is provided in the recess A (see FIGS. 3, 4, and 10).

According to the above configuration, the stabilizer support part 62 is arranged in the recess A for arranging a rack. Thus, in the suspension of a tension rod type, the support stiffness of the tension rod 51 and the attaching stiffness of the sub-crash can 7 can be increased, and the tension rod supporting part 14, the stabilizer support part 62, and the steering rack 55 can be arranged so as to overlap in the vertical direction along the vehicle longitudinal direction. Thus, the compact configuration can be achieved in the vertical direction.

Specifically, the stabilizer support part 62 is formed by fastening, by the bolt B, the stabilizer attaching bracket 60, which is a separate member, to the lower face of the closed-section coupling part 15 having the recess A thereabove (see FIGS. 3 and 10). Thus, the coupling stiffness of the closed-section coupling part 15 coupling the tension rod supporting part 14 and the side member 6 can be increased, and as a result, the supporting stiffness of the tension rod 51 and the attaching stiffness of the sub-crush can 7 can be increased.

Moreover, the steering rack 55 is arranged in the recess A behind the tension rod supporting part 14 and below the side member 6 (FIGS. 3, 4 and 10). Thus, the recess A, which is originally a dead space, can be effectively used. Further, the stabilizer support part 62 is also disposed in the recess A in which the steering rack 55 is disposed. Thus, the space of the recess A can be more effectively used.

In addition, the recess A is formed behind the tension rod supporting part 14 (see the same drawings). Thus, as described above, by providing the stabilizer support part 62 in the recess A, the stabilizer 100 can be disposed at a position in which the stabilizer 100 overlaps the tension rod 51 in the vertical direction. Thus, the compact configuration can be achieved in the vertical direction.

Further, the above-described effective use of the space of the recess A will be described in detail. The position of the arm supporting parts 71 is determined to obtain a desired behavior of the suspension. In the configuration in which the arm supporting part 71 is disposed behind the steering rack 55, the side member 6 is arranged and laid out in the front and rear at the substantially same height (the vertical same position) as those of the steering rack 55 and the arm supporting part 71. Thus, it is difficult to linearly arrange the side member 6. In addition, if the side member 6 is arranged to vary up and down to bypass the steering rack 55 and the arm supporting part 71, an unreasonable load is likely to be applied in the middle during the load transmission.

Thus, as countermeasures, the side member 6 is disposed so that the front part thereof is offset upward with respect to the steering rack 55 and the arm supporting part 71 and the rear part thereof is extended obliquely downward. Thus, the restriction of the layout is eliminated, and a bent part is reduced such that no excessive load is applied in the middle of the side member 6 (see FIG. 4).

That is, the front sub-frame 5 of this embodiment has a configuration in which the side member 6 is offset upward with respect to the lower arm 52 including the arm supporting part 71 and the steering rack 55 and arranged in the longitudinal direction such that the load from the sub-crash can 7 is collected temporarily in the upper part of the side member 6, and then transmitted from the front part of the side member 6 to the rear part.

In this manner, the side member 6 is displaced upward in one side (i.e., is offset upward), and thus the recess A is formed behind the tension rod supporting part 14 and below the side member 6. In this embodiment, as described above, the recess A, which is originally likely to be a dead space, is used as the recess A for arranging the steering rack 55, and moreover, the stabilizer support part 62 is also disposed in the recess A. Thus, the space of the recess A can be effectively used.

As an aspect of the technique disclosed in this specification, the sub-crash can attachment part 12 is provided in front of the tension rod supporting part 14 (see FIGS. 1 through 4 and 7). In addition, between the rear wall face 42 of the tension rod supporting part 14 and the front part of the side member 6, the closed-section coupling part 15 having a closed-section extending in the longitudinal direction and coupling them is provided (see FIGS. 9A and 10). In addition, the stabilizer support part 62 is fastened so as to connect the upper and lower faces of the closed-section coupling part 15 (see FIG. 10).

According to the above configuration, between the rear wall face 42 of the tension rod supporting part 14 and the front part of the side member 6, the closed-section coupling part 15 having a closed-section extending in the longitudinal direction is provided. Thus, even if the sub-frame front structure 10 is formed of a plate material such as a steel plate, the strength thereof can be increased. Moreover, the stabilizer support part 62 is configured to fasten the stabilizer 100 via the stabilizer attachment bracket 60 and with the bolt B and the nut so as to couple the upper and lower faces of the closed-section coupling part 15. Thus, the strength between the rear wall face 42 of the tension rod supporting part 14 and the front part of the side member 6 can be further increased in the longitudinal direction.

Moreover, the recess A is opened downward (see FIGS. 4 and 10). Thus, even if the stabilizer support part 62 is fastened so as to couple the upper and lower faces of the closed-section coupling part 15 provided above the recess A, it is easy to fasten the stabilizer attaching bracket 60 to the closed-section coupling part 15, and the excellent assembling property between the stabilizer 100 and the closed-section coupling part 15 can be ensured.

Thus, according to the above configuration, both the assembling property of the stabilizer 100 to the closed-section coupling part 15 and the reinforcement of the closed-section coupling part 15 in the longitudinal direction by the stabilizer support part 62 can be achieved. Thus, the attachment stiffness of the sub-crash can 7 can be increased.

As an aspect of the technique disclosed in this specification, the stabilizer support part 62 is disposed to be sandwiched between the rear wall face 42 of the tension rod supporting part 14 and the steering rack 55 (see FIGS. 4 and 10).

According to the above configuration, when the closed-section coupling part 15 near the recess A is bent and deformed by the front collision load, the load can be dispersed backward by the stabilizer support part 62 and the steering rack 55 disposed in the recess A.

Specifically, in the recess A, the stabilizer support part 62 and the steering rack 55 are arranged substantially in parallel in the longitudinal direction. Thus, even if, at the time of a front collision causing a load, the front sub-frame 5 is forced to bend so that the recess A is crushed with respect to the closed-section coupling part 15 as a fulcrum above the recess A, the stabilizer 100 and the steering rack 55 interfere with each other such that it is possible to prevent the front sub-frame 5 from being bent at a stroke in a perpendicular direction.

Thus, the sub-crash can 7 can be crushed properly against the front collision load to absorb the collision energy, and the inhibition of the smooth load transmission toward the vehicle body can be reduced.

In this embodiment, the pair of tension rod supporting holes 41a, 41a, the through holes 15a, 15b (the stabilizer support holes), and the side member 6 are disposed substantially in series in the vehicle longitudinal direction (see FIGS. 3, 8, 9A, and 9B).

In other words, in this embodiment, the tension rod support shaft 44, the front stabilizer fastening part 63a, the rear stabilizer fastening part 63b, and the side member 6 are disposed substantially in series in the vehicle longitudinal direction (see the same drawings).

According to the above configuration, the offset amount (displacement amount) in the vehicle width direction of the load path from the tension rod supporting part 14 to the side member 6 via the closed-section coupling part 15 is reduced as much as possible so that the front collision load can be transmitted along the high stiffness portion between the tension rod supporting part 14 and the side member 6 in the vehicle longitudinal direction. Thus, the front sub-frame 5 of this embodiment has the configuration in which the recess A is provided behind the tension rod supporting part 14 and under the side member 6, whereas the stiffness against the front collision can be improved.

Furthermore, in this embodiment, the left and right tension rod supporting parts 14 and 14 are coupled to the sus-cross member 73, and the tension rod supporting part 14 is inclined rearward and outward (see FIGS. 1, 3 and 7). The stabilizer support part 62 is adjacent to the rear of the tension rod supporting part 14, and the stabilizer 100 is disposed along the laterally inner wall face 43 of the tension rod supporting part 14 and the sus-cross member 73 (See FIGS. 1 through 4).

According to the above configuration, the stabilizer 100 is provided so as to inclined from the stabilizer support part 62 adjacent to the rear of the tension rod supporting part 14 toward the front side of inner side in the vehicle width direction along the wall surface 43 of the tension rod supporting part 14 and the sus-cross member 73. Thus, the installation space for the power steering actuator 56 and the power steering pinion 57 provided in the steering rack 55 can be secured, the layout property can be increased, and the stiffness of the inclined part of the stabilizer 100 in the longitudinal direction can be secured.

Further, the recess A includes a recessed passing part through which the stabilizer 100 extends in the vehicle width direction, the recessed passing part extending linearly (horizontally) in the vehicle width direction (see FIGS. 3 and 4), and The stabilizer support part 62 is disposed in the recess A wherein the recessed passing part for the stabilizer 100 is supported on the closed-section coupling part 15 via the stabilizer attaching bracket 60 (see FIGS. 4 and 10).

As such, the recessed passing part for the stabilizer 100 does not have a component in the longitudinal direction, and thus the stiffness in the longitudinal direction is likely to be lower compared with the case where the recessed passing part have such a component. However, the stabilizer support part 62 is fastened to the lower face of the closed-section coupling part 15 via the stabilizer attaching bracket 60 so that the stabilizer fastening parts 63a, 63b are arranged in the front and rear side. Thus, the stiffness in the longitudinal direction including the recessed passing part for the stabilizer 100 can be improved.

The correspondences between the configuration of the technique disclosed in this specification and the above-described embodiment will be described. The front part of the sub-frame corresponds to the sub-frame front structure 10. Similarly, the rear face of the tension rod supporting part corresponds to the rear wall face 42 of the tension rod supporting bracket 40. The rack arrangement step corresponds to the recess A. However, the technique disclosed in this specification is not limited to only the configuration of the above-described embodiment.

For example, as long as the above-described sub-crash can load transferring member 30 has a bottom opening shape with at least the partition wall 33 and the outer face 31, the inner face 32 may or may not have the configuration of the embodiment.

The existence of the main crush can such as the sub-crash can 7 in the front sub-frame 5 as shown in the above-described embodiment is not necessarily contained in the technique disclosed in this specification.

For example, clearly, an impact load absorbing part may be provided on the bumper reinforcement itself or the front side frame itself, i.e., can be applicable to a vehicle without a crash can in addition to the vehicle including the sub-crash can 7 of the embodiment.

INDUSTRIAL APPLICABILITY

As described above, the technique disclosed in the present specification is useful for the front sub-frame structure wherein the tension rod supporting part is provided in the front part of the front sub-frame, and the side member is extended rearward from the tension rod supporting part.

DESCRIPTION OF REFERENCE CHARACTERS (6) Side Member
(10) Sub-Frame Front Structure (Front Part of Sub-Frame)
(12) Sub-Crash Can Attachment Part
(14) Tension Rod Supporting Part
(15) Closed-Section Coupling Part
(42) Rear Wall Face (Rear Face of Tension Rod Supporting Part)
(55) Steering Rack
(62) Stabilizer Support Part
(A) Recess (Rack Placement Step)

The invention claimed is:

1. An automobile front sub-frame structure including a pair of left and right front side frames extending from a cabin front face toward a vehicle front, and a front sub-frame disposed below the front side frames and supporting a front suspension device, wherein
a tension rod supporting part is provided at a front part of the front sub-frame,
a side member is disposed upward on one side and extends rearward from the tension rod supporting part,
a rack arrangement step opened downward for arranging a steering rack is formed behind the tension rod supporting portion and under the side member,
a stabilizer support part is provided in the rack arrangement step,
a sub-crash can attachment part is provided in front of the tension rod supporting part,
between a rear face of the tension rod supporting part and a front face of the side member, a closed-section coupling part having a closed-section extending in a longitudinal direction and coupling the rear face of the tension rod supporting part and the front face of the side member is provided, and the stabilizer support part includes a stabilizer attachment bracket and is fastened via the stabilizer attachment bracket and with a bolt and a nut so as to connect upper and lower faces of the closed-section coupling part.

2. An automobile front sub-frame structure including a pair of left and right front side frames extending from a cabin front face toward a vehicle front, and a front sub-frame disposed below the front side frames and supporting a front suspension device, wherein
- a tension rod supporting part is provided at a front part of the front sub-frame,
- a side member is disposed upward on one side and extends rearward from the tension rod supporting part,
- a rack arrangement step opened downward for arranging a steering rack is formed behind the tension rod supporting portion and under the side member,
- a stabilizer support part is provided in the rack arrangement step, and
- the stabilizer support part is disposed to be sandwiched between a rear face of the tension rod supporting part and the steering rack.

* * * * *